United States Patent [19]

Okawa et al.

[11] Patent Number: 4,924,020
[45] Date of Patent: May 8, 1990

[54] PHTHALIC ACID ESTER-MODIFIED ORGANOPOLYSILOXANE AND METHOD FOR ITS PREPARATION

[75] Inventors: Tadashi Okawa, Ichihara; Toshio Suzuki, Kimitsu, both of Japan

[73] Assignee: Toray Silicon Company, Ltd., Tokyo, Japan

[21] Appl. No.: 269,804

[22] Filed: Nov. 10, 1988

[30] Foreign Application Priority Data

Nov. 18, 1987 [JP] Japan ................. 62-290900

[51] Int. Cl.$^5$ ............................................. C07F 7/08
[52] U.S. Cl. ................................................. 556/441
[58] Field of Search ..................................... 556/441

[56] References Cited

U.S. PATENT DOCUMENTS

| | | | |
|---|---|---|---|
| 3,542,836 | 11/1970 | Adams | 556/441 X |
| 3,631,084 | 12/1971 | Sistou | 556/441 |
| 4,636,573 | 1/1987 | Pastor et al. | 556/441 |

*Primary Examiner*—Paul F. Shaver
*Attorney, Agent, or Firm*—Alexander Weitz

[57] ABSTRACT

There is disclosed a novel phthalic acid ester-modified organopolysiloxane having the general formula

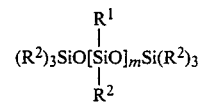

where in $R^1$ is a monovalent hydrocarbon group, $R^2$ is a group $R^1$ or a group with the formula

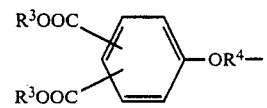

with the proviso that at least one of the groups $R^2$ in each molecule is the group with the formula

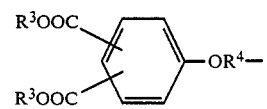

in which $R^3$ is an alkyl group, $R^4$ is an alkylene group, and m is a positive integer.

The organosiloxane is useful as a co-reactant in the preparation of organic resins such as polyesters, polyamides and polyimides.

6 Claims, No Drawings

PHTHALIC ACID ESTER-MODIFIED ORGANOPOLYSILOXANE AND METHOD FOR ITS PREPARATION

The present invention relates both to a novel organopolysiloxane as well as to a method for its preparation. More specifically, the present invention relates to a novel organopolysiloxane which contains the phthalic acid ester group in the molecule, and also to a method for its preparation.

BACKGROUND OF THE INVENTION

Organopolysiloxanes have a very broad range of characteristics, for example, occurring as oils, rubbers, and solid resins, by virtue of variations in the composition of their basic structure, dimensions, configuration, species of pendant group, and molecular weight, among others. This, coupled with their characteristic heat resistance, cold resistance, oxidation stability, ageing resistance, releaseability, and water resistance, etc., has resulted in their use in a wide variety of industrial spheres, for example, in the textile industry, for release paper, in the electric/electronics industries, in construction, and as paint additives. However, organopolysiloxanes having the phthalic acid ester group in the molecule and a method for their preparation have both heretofore been unknown.

SUMMARY OF THE INVENTION

The present invention introduces a useful and novel organopolysiloxane which contains the phthalic acid ester group in the molecule, and also introduces an efficient method for its preparation.

The present invention therefore relates to a phthalic acid ester-modified organopolysiloxane characterized by the formula

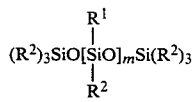

wherein $R^1$ is a monovalent hydrocarbon group, $R^2$ is $R^1$ or a group with the formula

with the proviso that at least one of the groups $R^2$ in each molecule is the group

in which $R^3$ is an alkyl group, $R^4$ is an alkylene group, and m is a positive integer The present invention further relates to a method for preparing the above described organopolysiloxane comprising reacting, in the presence of a platinum-type catalyst, an organohydrogenpolysiloxane having the formula

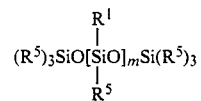

wherein $R^1$ is a monovalent hydrocarbon group, $R^5$ is group $R^1$ or a hydrogen atom, with the proviso that at least one of the groups $R^5$ in each molecule is a hydrogen atom, and m is a positive integer, with a phthalic acid ester compound having the formula

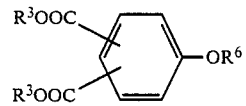

in which $R^3$ is an alkyl group and $R^6$ is an alkenyl group.

DETAILED DESCRIPTION OF THE INVENTION

The phthalic acid ester-modified organopolysiloxane of the present invention has the formula

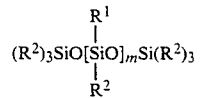

wherein $R^1$ is a monovalent hydrocarbon group, $R^2$ is a group $R^1$ or a group with the formula

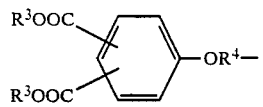

with the proviso that at least one of the groups $R^2$ in each molecule is the group with the formula

$R^3$ is an alkyl group, $R^4$ is an alkylene group, and m is a positive integer.

$R^1$ in the above formula is a monovalent hydrocarbon group, as exemplified by alkyl groups such as methyl, ethyl, propyl, and octyl; substituted alkyl groups, such as 2-phenylethyl, 2-phenylpropyl and 3,3,3-trifluoropropyl; aryl groups, such as phenyl and tolyl; and substituted aryl groups. $R^2$ comprises a group $R^1$ or a group with the formula

in which $R^3$ and $R^4$ have their previously defined meanings.

The location at which the phthalic acid ester group is bonded is not specifically restricted, and it may be an ortho-phthalic acid ester, a meta-phthalic acid ester or a para-phthalic acid ester. $R^3$ is an alkyl group, as exemplified by methyl, ethyl, propyl and octyl. $R^4$ is an alkylene group, and examples in this regard are
—$CH_2CH_2$—
—$CH_2CH_2CH_2$—
—$CH(CH_3)CH_2$—
—$(CH_2)_4$— and
—$(CH_2)_5$—

In the above formula for the phthalic acid ester-modified organopolysiloxane, m is a positive integer, preferably having a value of 1 to 5,000.

The following are provided as concrete examples of the phthalic acid ester-modified organopolysiloxane of the present invention.

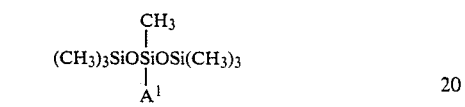

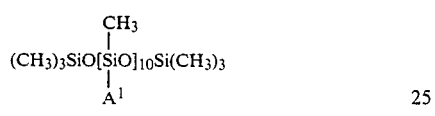

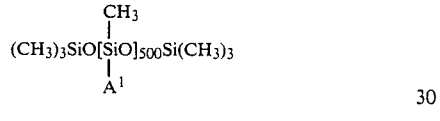

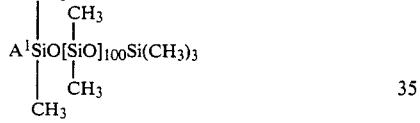

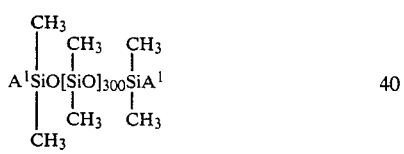

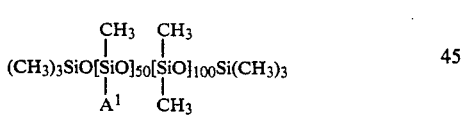

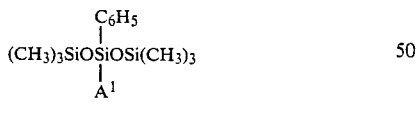

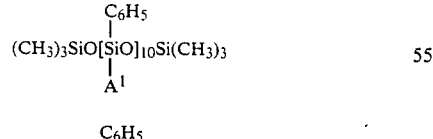

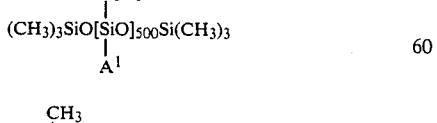

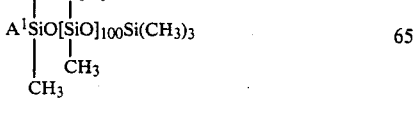

-continued

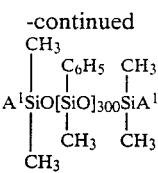

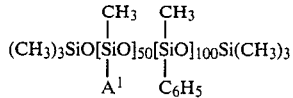

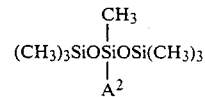

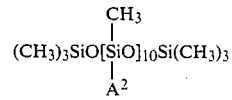

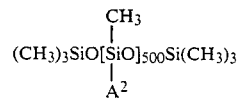

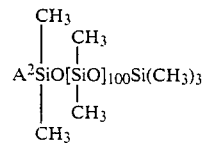

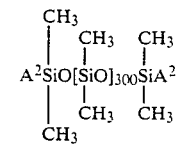

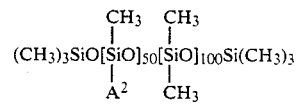

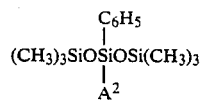

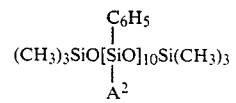

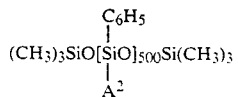

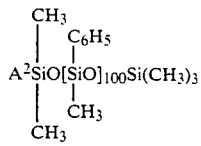

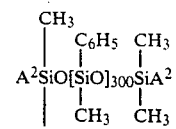

-continued $$(CH_3)_3SiO[\underset{\underset{A^2}{|}}{\overset{\overset{CH_3}{|}}{Si}}O]_{50}[\underset{\underset{C_6H_5}{|}}{\overset{\overset{CH_3}{|}}{Si}}O]_{100}Si(CH_3)_3$$

$$(CH_3)_3SiO\underset{\underset{A^3}{|}}{\overset{\overset{CH_3}{|}}{Si}}OSi(CH_3)_3$$

$$(CH_3)_3SiO[\underset{\underset{A^3}{|}}{\overset{\overset{CH_3}{|}}{Si}}O]_{10}Si(CH_3)_3$$

$$(CH_3)_3SiO[\underset{\underset{A^3}{|}}{\overset{\overset{CH_3}{|}}{Si}}O]_{500}Si(CH_3)_3$$

$$A^3\underset{\underset{CH_3}{|}}{\overset{\overset{CH_3}{|}}{Si}}O[\underset{\underset{CH_3}{|}}{\overset{\overset{CH_3}{|}}{Si}}O]_{100}Si(CH_3)_3$$

$$A^3\underset{\underset{CH_3}{|}}{\overset{\overset{CH_3}{|}}{Si}}O[\underset{\underset{CH_3}{|}}{\overset{\overset{CH_3}{|}}{Si}}O]_{300}SiA^3$$

$$(CH_3)_3SiO[\underset{\underset{A^3}{|}}{\overset{\overset{CH_3}{|}}{Si}}O]_{50}[\underset{\underset{CH_3}{|}}{\overset{\overset{CH_3}{|}}{Si}}O]_{100}Si(CH_3)_3$$

$$(CH_3)_3SiO\underset{\underset{A^3}{|}}{\overset{\overset{C_6H_5}{|}}{Si}}OSi(CH_3)_3$$

$$(CH_3)_3SiO[\underset{\underset{A^3}{|}}{\overset{\overset{C_6H_5}{|}}{Si}}O]_{10}Si(CH_3)_3$$

$$(CH_3)_3SiO[\underset{\underset{A^3}{|}}{\overset{\overset{C_6H_5}{|}}{Si}}O]_{500}Si(CH_3)_3$$

$$A^3\underset{\underset{CH_3}{|}}{\overset{\overset{CH_3}{|}}{Si}}O[\underset{\underset{CH_3}{|}}{\overset{\overset{C_6H_5}{|}}{Si}}O]_{100}Si(CH_3)_3$$

$$A^3\underset{\underset{CH_3}{|}}{\overset{\overset{CH_3}{|}}{Si}}O[\underset{\underset{CH_3}{|}}{\overset{\overset{C_6H_5}{|}}{Si}}O]_{300}SiA^3$$

$$(CH_3)_3SiO[\underset{\underset{A^3}{|}}{\overset{\overset{CH_3}{|}}{Si}}O]_{50}[\underset{\underset{C_6H_5}{|}}{\overset{\overset{CH_3}{|}}{Si}}O]_{100}Si(CH_3)_3$$

wherein $A^1$ is

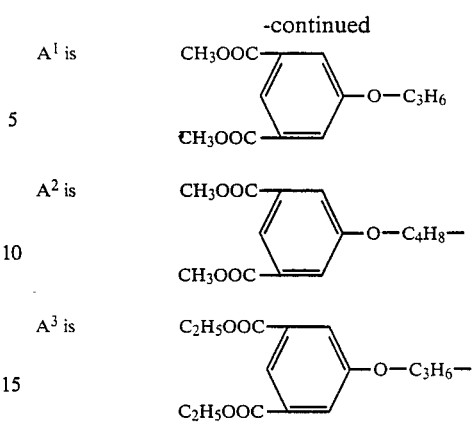

$A^2$ is

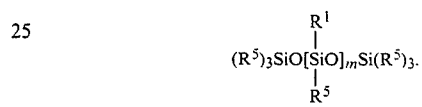

$A^3$ is

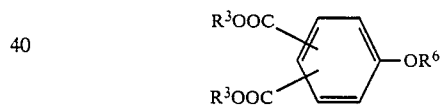

The present invention's method for the preparation of the phthalic acid ester-modified organopolysiloxane follows. The organohydrogenpolysiloxane used as the initial starting material in the present invention's method has the formula $$(R^5)_3SiO[\underset{\underset{R^5}{|}}{\overset{\overset{R^1}{|}}{Si}}O]_m Si(R^5)_3.$$

In this formula, $R^1$ is a monovalent hydrocarbon group, which is exemplified as above. $R^5$ is a group $R^1$ or a hydrogen atom, and at least one group $R^5$ in each molecule is a hydrogen atom. Again, m is a positive integer, preferably with a value of 1 to 5,000.

The phthalic acid ester compound used in conjunction with the above organohydrogenpolysiloxane in the method of the present invention has the formula

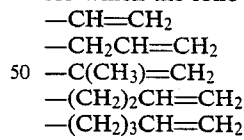

wherein $R^3$ is an alkyl group and $R^6$ is an alkenyl group. $R^3$ in the above formula is an alkyl group, and this group is exemplified as above. $R^6$ is an alkenyl group, for which the following are exemplary:

—CH=CH$_2$
—CH$_2$CH=CH$_2$
—C(CH$_3$)=CH$_2$
—(CH$_2$)$_2$CH=CH$_2$
—(CH$_2$)$_3$CH=CH$_2$

The phthalic acid ester compound is readily synthesized by a "Williamson ether synthesis reaction" between an alkenyl halide and an hydroxyphthalic acid, and by submitting the product to an esterification reaction.

The platinum-type catalyst used in the method of the present invention functions to promote the addition reaction between the SiH group in the organohydrogenpolysiloxane and the alkenyl group in the phthalic acid ester compound.

Examples of these platinum-type catalysts are chloroplatinic acid, alcohol-modified chloroplatinic acid, chloroplatinic acid/olefin complexes, complexes of chloroplatinic acid and vinyl group-containing organopolysiloxanes, platinum black, catalysts in which solid platinum is supported on a carrier such as silica or alumina, as well as rhodium/olefin complexes.

The method of the present invention consists of reacting the above-mentioned organohydrogenpolysiloxane and phthalic acid ester compound in the prsence of the platinum-type catalyst. The organohydrogenpolysiloxane and phthalic acid ester compound should be used in proportions such that the molar ratio of siloxane SiH to alkenyl groups in the phthalic acid ester compound preferably falls within the range of 1:1 to 1:10 and more preferably 1:1 to 1:3.

The reaction environment is not specifically restricted, and the reaction can be run in the presense or absense of solvent, in the air or under an inert gas, and under ambient pressure, elevated pressures, or reduced pressures.

Various reaction solvents can be used here, with the proviso that they do not inhibit the addition reaction between the oganohydrogenpolysiloxane and the phthalic acid ester compound. Concrete examples include aromatic hydrocarbon solvents, such as benzene, toluene and xylene; aliphatic hydrocarbon solvents, such as hexane and heptane; ether solvents, such as tetrahydrofuran and diethyl ether; alcohol solvents, such as methanol, ethanol, propanol and butanol; ketone solvents such as acetone and methyl ethyl ketone; ester solvents, such as ethyl acetate and butyl acetate; halogenated hydrocarbon solvents such as carbon tetrachloride, tetrachloroethane and chloroform; dimethylformamide; and dimethyl sulfoxide.

The reaction can be run at room temperature, but in general it is advantageous to run the reaction at 50 to 200 degrees Centigrade.

The phthalic acid ester-modified organopolysiloxane of the present invention, by virtue of its content of 2 ester functional groups, can be added as a copolyermization component in the preparation of organic resins such as, for example, polyesters, polyamides and polyimides. The particular characteristics of organopolysiloxanes, such as hydrophobicity, water resistance, ageing resistance, etc., will thus presumably be imparted to the organic resin.

EXAMPLES

The present invention is illustrated by the following examples. In the examples, %=weight%, Me=methyl and properties were measured at 25 degrees Centigrade unless specified otherwise. Furthermore, the solvent and reagents were dried until the water fraction could not be detected.

(REFERENCE) EXAMPLE 1

137.3 mmol (25 g) 5-hydroxyisophthalic acid, 164.71 mmol (19.9 g) allyl bromide, 27 g potassium hydroxide, 750 mL ethanol and 150 mL water were charged to a stirrer-equipped four-neck flask. After heating under reflux for 10 hours, 120 mL 10% aqueous potassium hydroxide was added. After hydrolysis by heating under reflux for 2 hours, neutralization was carried out by the addition of dilute (10%) hydrochloric acid. The solvent was removed on an evaporator, followed by extraction of the product with diethyl ether and distillation of the diethyl ether to afford crude crystals. These were recrystallized from water/ethanol to give 19.1 g colorless crystals. The results of NMR and IR analyses identified these crystals as 5-allyloxyisophthalic acid.

45.0 mmol (10 g) 5-allyloxyisophthalic acid, 150 mL methanol and 0.23 mL concentrated hydrochloric acid were then charged to a stirrer-equipped four-neck flask and heated under reflux for 6 hours. The methanol was then removed on an evaporator, the hydrochloric acid was neutralized with aqueous sodium bicarbonate and extraction with chloroform was carried out. Removal of the chloroform gave 5.5 g colorless crystals. The results of nuclear magnetic resonance (NMR) and infrared absorption spectroscopic (IR) analyses identified these crystals as dimethyl 5-allyloxyisophthalate.

EXAMPLE 1

200 g hexamethylcyclotrisiloxane in tetrahydrofuran and 16.0 mL of a 1.62 N hexane solution of n-butyllithium were charged to a stirrer-equipped four-neck flask and were reacted for 1.5 hours at room temperature under a nitrogen blanket. When the extent of the reaction reached 85% (by gas chromatography), neutralization was carried out by the addition of 38.8 mmol (3.67) dimethylchlorosilane with stirring. After filtration, the solvent and unreacted materials were removed by distillation in vacuo to afford a polymer designated as HP-1.

HP-1 was identified as an organopolysiloxane with the following average formula by means of gel permeation chromatography (GPC), nuclear magnetic resonance absorption (NMR), infrared absorption spectroscopy (IR), and SiH group quantitation by iodometry:

$n$—$C_4H_9$—$(Me_2SiO)_{87}SiMe_2H$

This polymer's molecule weight distribution dispersity index ($M_w/M_n$) was 1.09 as determined by GPC.

The following were charged to a stirrer-equipped four-neck flask: 17.1 mmol (112.0 g) HP-1, 17.1 mmol (4.28 g) dimethyl allyloxyisophthalate as synthesized in (Reference) Example 1, 120 g toluene, and isopropanolic chloroplatinic acid in a quantity sufficient to provide a weight ratio of 20 ppm for the quantity of platinum relative to HP-1. This was sampled after heating under reflux for 5 hours, and disappearance of the SiH peak was confirmed by IR spectroscopy. Removal of the solvent by distillation in vacuo gave a polymer designated as FP-1.

The results of analyses by GPC, NMR, and IR identified FP-1 to be an organopolysiloxane with the following average formula (viscosity=100.6 centistokes, refractive index=1.4099):

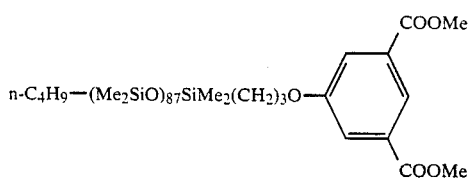

EXAMPLE 2

338 mmol (100 g) octamethylcyclotetrasiloxane, 18.0 mmol (2.41 g) 1,1,3,3-tetramethyldisiloxane, 0.102 g trifluoromethanesulfonic acid and 0.010 g water were charged to a stirrer-equipped four-neck flask and reacted for 5 hours at 60 to 80 degrees Centigrade.

Addition of 5 g dimethylformamide for neutralization, filtration, and removal of the volatiles by distillation in vacuo afforded a polymer designated as HP-2. HP-2 was identified as an organopolysiloxane having the following average formula by means of GPC, NMR, IR and SiH group quantitation by iodometry:

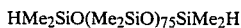
HMe$_2$SiO(Me$_2$SiO)$_{75}$SiMe$_2$H 17.6 mmol (100 g) HP-2, 35.2 mmol (8.80 g) dimethyl allyloxyisophthalate as synthesized in (Reference) Example 1, 100 g toluene and platinum/divinyltetramethyldisiloxane complex in a quantity providing 20 ppm platinum based on HP-2 were then charged to a stirrer-equipped four-neck flask. After heating under reflux for 5 hours, sampling, and examination by IR, disappearance of the SiH peak was confirmed. A polymer designated as FP-2 was recovered by removing the solvent by distillation in vacuo. The results of analyses by GPC, NMR, and IR confirmed FP-2 to be the following organopolysiloxane (viscosity=172 centistokes, refractive index=1.4158):

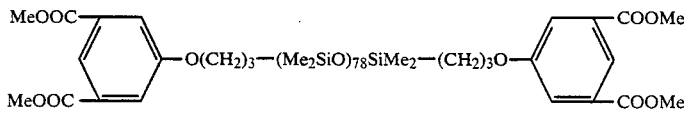

EXAMPLE 3

1.76 mmol (20.0 g) organohydrogensiloxane with the formula

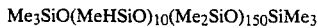
Me$_3$SiO(MeHSiO)$_{10}$(Me$_2$SiO)$_{150}$SiMe$_3$ 17.6 mmol (4.40 g) dimethyl allyloxyisophthalate as synthesized in (Reference) Example 1, 100 g toluene and platinum/divinyltetramethyldisiloxane complex in a quantity sufficient to give 20 ppm platinum based on the aforesaid oganohydrogensiloxane were charged to a stirrer-equipped four-neck flask. After heating under reflux for 5 hours, sampling, and IR examination, it was found that the SiH peak had disappeared. A polymer was recovered by removal of the solvent by distillation in vacuo. The results of analyses by GPC, NMR, and IR confirmed this polymer to be the following organopolysiloxane:

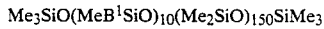
Me$_3$SiO(MeB$^1$SiO)$_{10}$(Me$_2$SiO)$_{150}$SiMe$_3$ in which B$^1$ has the structure

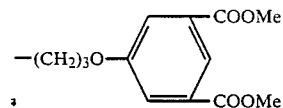

That which is claimed is:

1. Phthalic acid ester-modified organopolysiloxane characterized by the formula

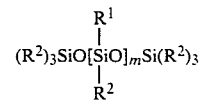

wherein R$^1$ is a monovalent hydrocarbon group, R$^2$ is a group R$^1$ or a group with the formula

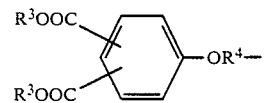

with the proviso that at least one of the groups R$^2$ in each molecule is the group with the formula

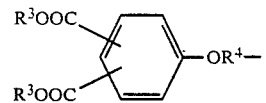

in which R$^3$ is an alkyl group, R$^4$ is an alkylene group, and m is a positive integer.

2. The phthalic acid ester-modified organopolysiloxane according to claim 1, wherein R$^1$ and R$^2$ are selected from the group consisting of methyl, ethyl and phenyl radicals.

3. The phthalic acid ester-modified organopolysiloxane according to claim 2, wherein m is 1 to 5,000.

4. The phthalic acid ester-modified organopolysiloxane according to claim 3, wherein R$^3$ is selected from the group consisting of methyl, ethyl and propyl radicals.

5. The phthalic acid ester-modified organopolysiloxane according to claim 4, wherein R$^4$ is selected from the group consisting of trimethylene and tetramethylene units.

6. The phthalic acid ester-modofied organopolysiloxane according to claim 5, wherein R$^1$, R$^2$ and R$^3$ are methyl radicals.

* * * * *